United States Patent [19]

Braun et al.

[11] Patent Number: 4,683,477

[45] Date of Patent: Jul. 28, 1987

[54] INK JET PRINT HEAD

[75] Inventors: Hilarion Braun, Xenia; Fletcher Bray, Fairfield, both of Ohio

[73] Assignee: Eastman Kodak Company, Rochester, N.Y.

[21] Appl. No.: 901,669

[22] Filed: Aug. 29, 1986

[51] Int. Cl.[4] .......... G01D 15/18

[52] U.S. Cl. .......... 346/75; 346/140 R

[58] Field of Search .......... 346/75, 140 R

[56] References Cited

U.S. PATENT DOCUMENTS

| | | | |
|---|---|---|---|
| Re. 31,358 | 8/1983 | Cha et al. | 346/75 |
| 3,927,410 | 12/1975 | Pimbley | 346/140 |
| 4,180,225 | 12/1979 | Yamada | 346/75 |
| 4,188,635 | 2/1980 | Giordano et al. | 346/75 |
| 4,257,052 | 3/1981 | Stoneburner | 346/75 |
| 4,284,993 | 8/1981 | Kakeno | 346/75 |
| 4,290,074 | 9/1981 | Royer | 346/75 |
| 4,331,964 | 5/1982 | VanLokeren | 346/75 |
| 4,370,662 | 1/1983 | Hou et al. | 346/75 |
| 4,563,688 | 1/1986 | Braun | 346/1.1 |

*Primary Examiner*—E. A. Goldberg
*Assistant Examiner*—Gerald E. Preston
*Attorney, Agent, or Firm*—Thomas H. Close

[57] ABSTRACT

An ink jet print head of the type having an elongated rectangular print head body that is vibrated at its resonant frequency to stimulate formation of ink drops is provided with a rigid ink supply tube connected to the print head body at a nodal point and is mounted by the rigid supply tube.

5 Claims, 3 Drawing Figures

INK JET PRINT HEAD

TECHNICAL FIELD

The present invention relates to the field of ink jet printing, and more particularly to improvements in ink jet print heads.

BACKGROUND ART

U.S. Pat. No. 4,563,688 issued Jan. 7, 1986 to H. Braun discloses an ink jet print head for continuous-multijet-, ink jet printing. As shown in FIG. 3, the ink jet print head 10 includes an elongated rectangular print head body 12 of high acoustic Q material such as stainless steel. The print head body 12 has a length L that is substantially greater than the other dimensions a and b. The size of the body, with respect to the Q of the material is selected to exhibit a resonant frequency in the longitudinal vibration mode at or very near to the ink drops frequency produced by the ink jet print head 10. The print head body 12 defines an ink reservoir 14, opening in a slot 16 in one end of the print head body 12. An orifice plate 18 defining a plurality of orifices 20 is fixed over the slot 16.

A pump 22 supplies ink under pressure from an ink supply 24 to the reservoir 14 via ink supply tube 26 and an ink supply channel 28 defined by the print head body 12. Ink is forced out of the orifices 20 to define a plurality of ink jets.

An ink outlet channel 30 and ink outlet tube 32 allow the reservoir to be flushed. A pair of piezoelectric transducers 34 (only one of which is shown) are driven by a periodic wave form from an oscillator 36, to excite the longitudinal mode of vibration in the print head body 12. The print head body is mounted by integral tabs 38 located at a nodal plane, so that the vibration of the print head is not transferred to or affected by the mounting. The longitudinal vibration of the print head body is transferred to the orifice plate 18 to thereby stimulate the ink jets to separate uniformly into drops.

The ink supply and outlet tubes 26 and 32 are made from a material selected to have a vibrational impedance substantially different from the print head body 12, such as flexible polymeric material, in an attempt to reduce the effect of the tubes on the vibrations of the print head body.

Although, the use of such polymeric material substantially reduces the effect of the tubes on the vibrational properties of the print head body 12, experiments have determined that there are still some undesirable effects on the vibration of the print head body. For example, relatively small variations in the mass and/or location of the tubes have been observed to cause large changes in the vibrational amplitude and small changes in the longitudinal resonant frequency of the print head body 12. Furthermore, the mounting mechanisms employing the integral tabs 38 requires extremely precise machining of the components to effect accurate placement of the print head, thus increasing the cost of manufacture of the print head.

It is the object of the present invention therefore to provide an improved means for supplying ink to, and mounting for the ink jet print head that solves the problems noted above.

DISCLOSURE OF THE INVENTION

The problems noted above are solved by the present invention by connecting rigid ink supply and outlet tubes to the print head body at a nodal plane, and employing the rigid tubes to mount the ink jet print head by holding the tubes in a fixture. Internal channels are formed in the print head body, from the supply and outlet tubes located at the nodal plane to the ink reservoir. To isolate the acoustic vibrations of the ink in the internal channels from the vibrations of the orifice plate, the internal channels are offset from the reservoir in a direction perpendicular to the long axis of the print head body.

In a preferred mode of the present invention, the print head body is formed from two slabs of material, grooves representing the reservoir and internal channels are machined into one face of one of the slabs. The other slab has plane surfaces. The slabs are attached together to form the print head body. Functional inlet and outlet tubes are provided on one side of the print head body, and mounting studs are provided on the other side. The inlet and outlet tubes and the mounting studs are held in a mounting fixture.

MODES OF CARRYING OUT THE INVENTION

Figure 1:
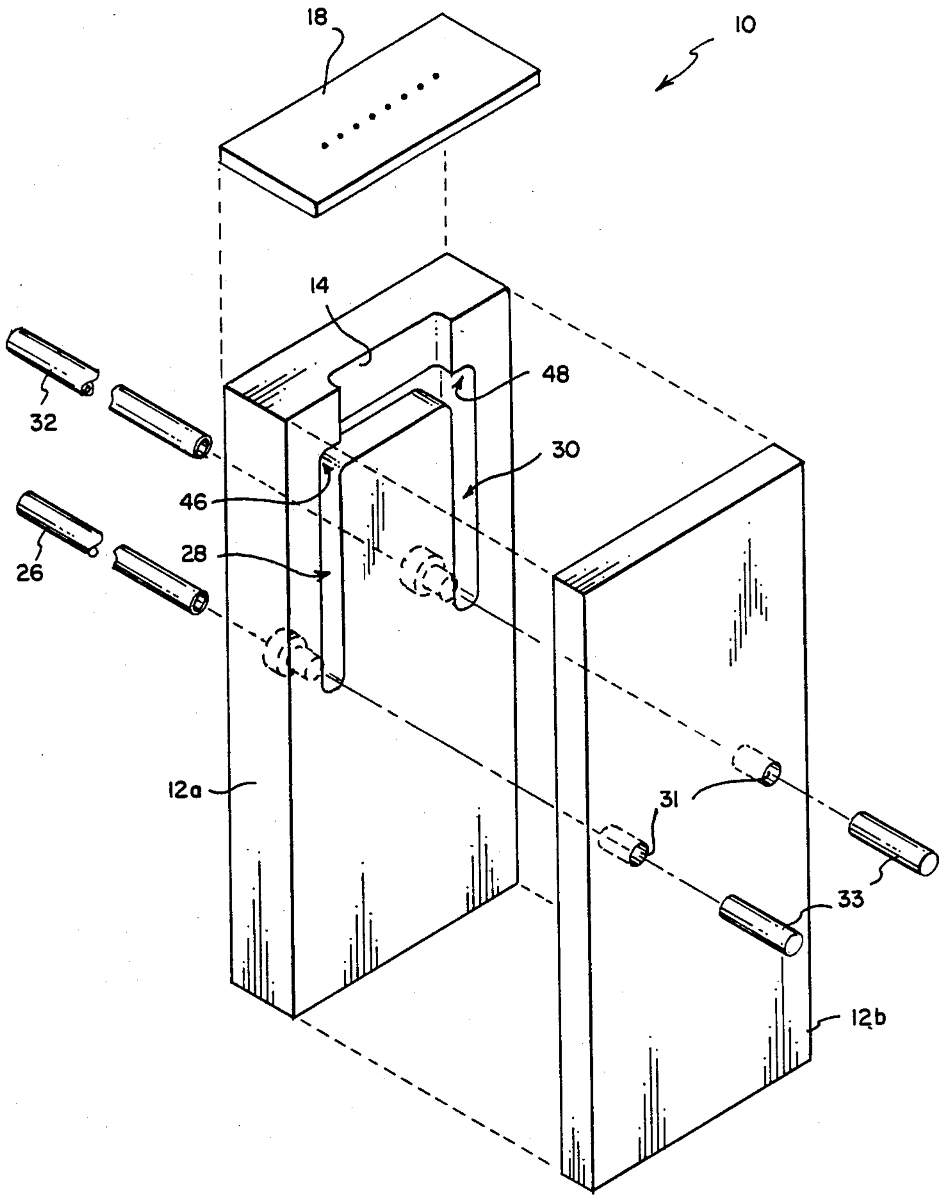
FIG. 1 is an exploded perspective view of an ink jet print head according to the present invention.
Figure 3:
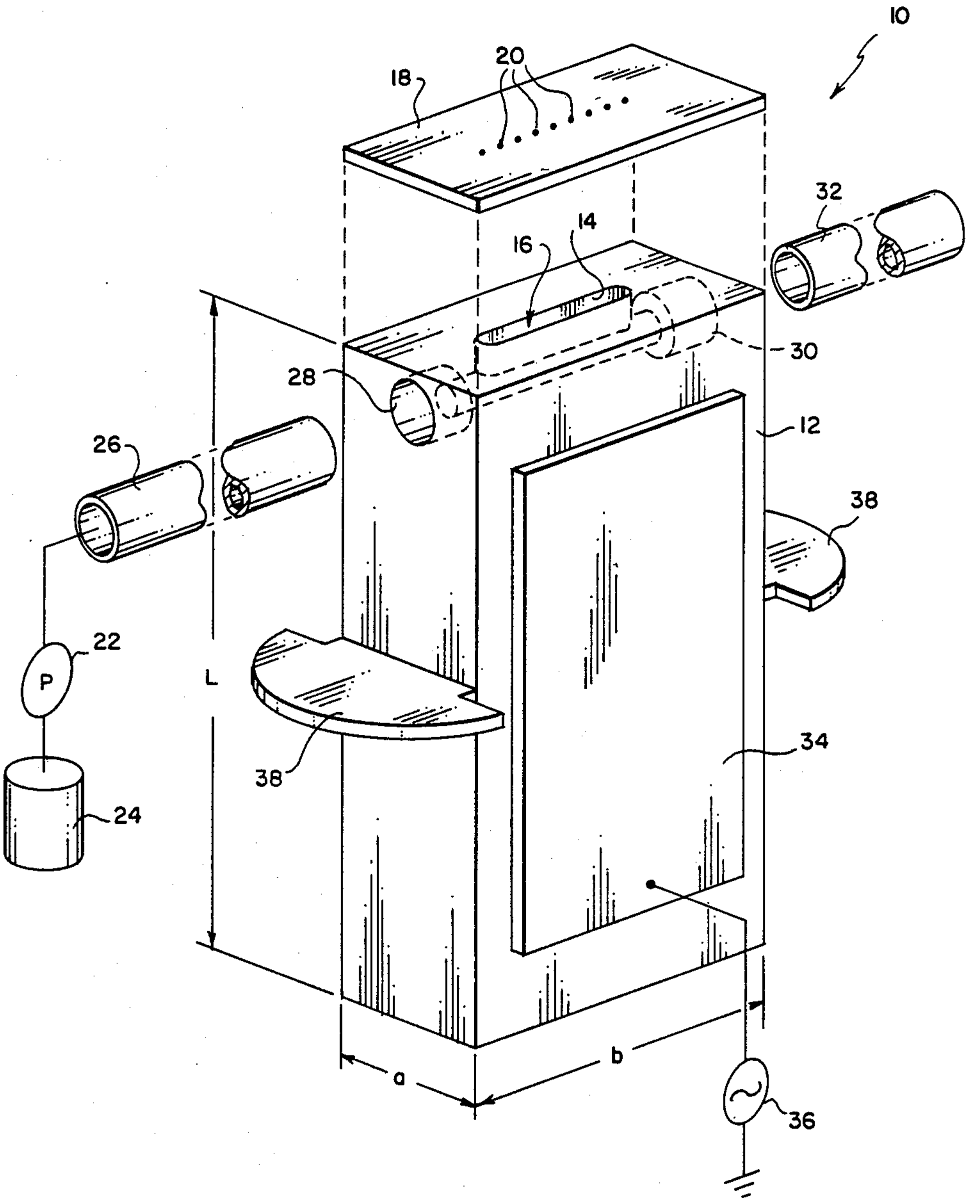
PRIOR ART FIG. 3
FIG. 3 is a perspective view of the prior art ink jet print head.

A preferred mode of carrying out the present invention is illustrated in FIG. 1, where elements similar to FIG. 3 are similarly numbered. The ink jet print head 10 includes a print head body 12 formed by two halves 12*a* and 12*b*. The two halves of the print head body are machined from rectangular slabs of stainless steel. One of the slabs (12*a*) has grooves machined in one face thereof to define the ink reservoir 14 and the ink supply and outlet channels 28 and 30. The supply and outlet channels 28 and 30 emerge on the opposite face of the slab 12*a* in the region of a nodal plane to provide access to the ink supply and outlet tubes 26 and 32 respectively. The other slab 12*b* has a plane face on one side, and a pair of holes 31 for receiving mounting studs 33 on the other side. The two slabs of stainless steel are brazed together, face-to-face, to form the print head body 12. The orifice plate 18 is fixed to the print head body over the open end of the ink reservoir 14.

Figure 2:
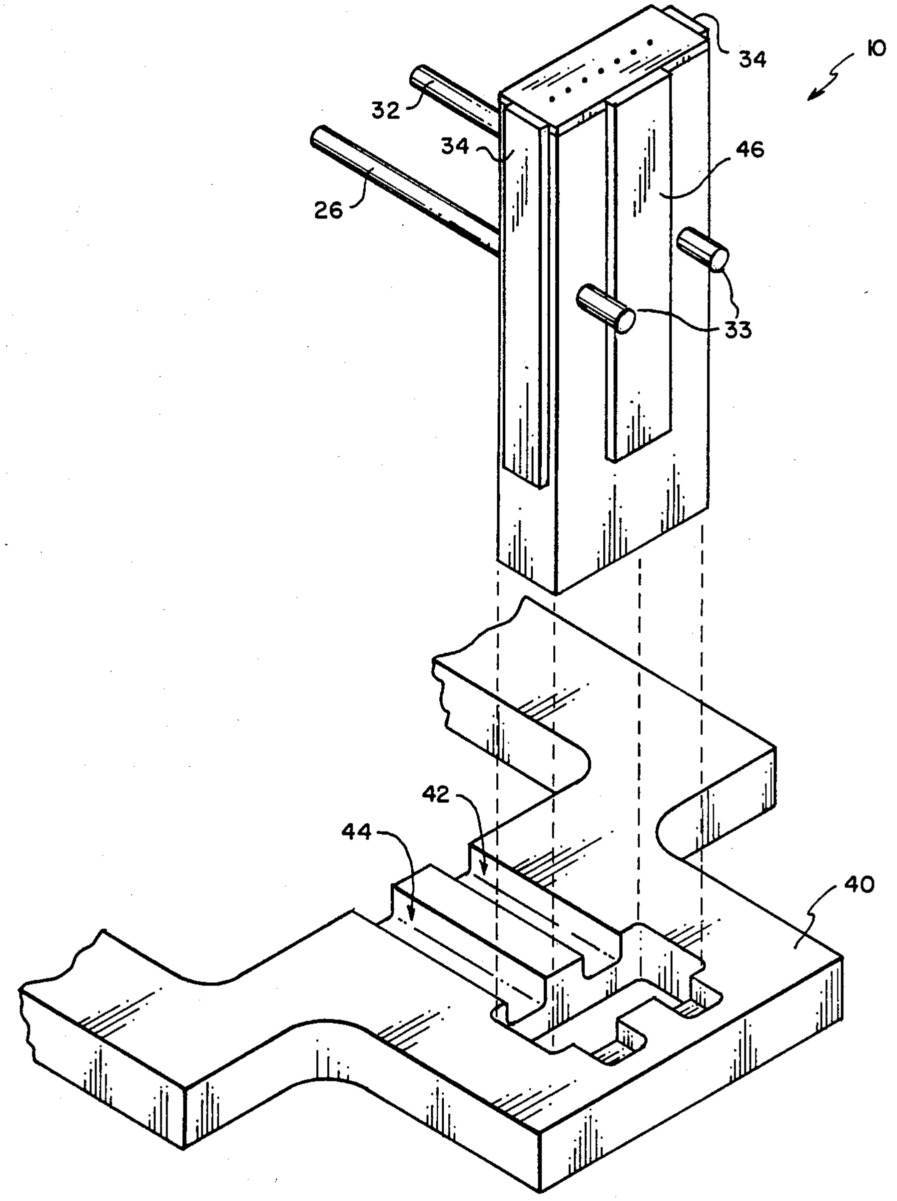
FIG. 2 is a perspective view showing the ink jet print head according to the present invention, and the mounting fixture.

Rigid (e.g. stainless steel) supply and outlet tubes 26 and 32 and rigid mounting studs 33 are connected to the print head body at the nodal plane and serve for mounting the print head body. Referring now to FIG. 2, the print head body 12 is mounted by holding the supply and outlet tubes 26 and 32 and the mounting studs 33 in a frame 40 having grooves 42 and 44 for receiving the tubes and mounting studs. In practice, some tolerance is provided in the fit between the grooves and the tubes and studs. The print head 10 is set in the frame 40 in an alignment jig (not shown), and the tubes and studs are potted in the grooves using a curable epoxy.

The inventor discovered through experimentation that acoustic vibrations of the ink in the supply and outlet channels 28 and 30 (see FIG. 1) will interfere with the proper stimulation of the ink jets. To overcome this problem, the supply and outlet channels 28 and 30 are offset from the reservoir 14 such that the acoustic vibrations in the vertical columns of the channels are substantially isolated from the reservoir 14.

Because of the sharp bends 46 and 48 in the channels 28 and 30 due to the offset, the print head body is not easily machined from a solid block. For this reason, the preferred method of fabricating the print head body is by constructing the two halves and brazing them together. An alternative method of fabrication is by casting the print head body 12. However, this method has not proven entirely satisfactory because of the difficulty of removing the core material.

A print head body according to the present invention was constructed from stainless steel. The overall dimensions of the print head body 12 were 3.2 cm. long by 1.2 cm. wide by 0.6 cm. thick. An orifice plate having 64 orifices was attached to the print head body 12. The piezoelectric transducers 34 (see FIG. 2) were fixed to the edges of the print head body 12. A feedback transducer 46 was attached to the side of the print head body having the mounting studs 33. The feedback transducer 46 was employed in the driver circuit as described in the above referenced U.S. Pat. No. 4,563,688. The print head body was adjusted in the frame 40 as described above, and assembled in an ink jet printer. The print head was driven at a frequency of ≃75 Khz to perform ink jet printing. The print head according to the present invention exhibited substantially improved performance over the prior art print head, showing a decreased sensitivity to external vibrations, and less critical requirements for the mass and location of the ink supply and outlet lines connected to the ink supply and outlet tubes.

INDUSTRIAL APPLICABILITY AND ADVANTAGES

The present invention is useful in the field of ink jet printing, and has the advantage that the ink jet print head is less susceptible to external vibrations of the ink supply tubes. Mounting of the ink jet print head is facilitated, and the location and mass of the lines to the ink supply tubes are less critical.

We claim:

1. An ink jet print head of the type having an elongated rectangular print head body defining an ink reservoir having an opening at one end of said elongated body, an orifice plate having a plurality of orifices fixed over said opening in said ink reservoir, for expelling ink from said orifices to form a plurality of ink jets, means for supplying ink under pressure to said reservoir, piezoelectric transducer means mounted on the exterior of said elongated body and extending in a longitudinal direction, for inducing longitudinal vibrations in said body to stimulate said ink jets, and mounting means for mechanically supporting said ink jet print head, said mounting means contacting said print head body at a nodal plane intermediate the ends of said print head body, characterized by: said means for supplying ink comprising rigid tube means connected to said print head body at said nodal plane and said mounting means comprising means for supporting said print head body by said rigid tube means.

2. The ink jet print head claimed in claim 1, wherein said tube means includes an inlet tube and an outlet tube, and said print head body further defines an inlet channel connecting said inlet tube from said nodal plane to said reservoir, and an outlet channel connecting said reservoir to said outlet tube at said nodal plane, said inlet and outlet channels extending generally parallel with the long axis of said print head body, and being offset with respect to said reservoir, whereby the acoustical vibrations of ink in said channels is effectively decoupled from the vibrations of said orifice plate.

3. The ink jet print head claimed in claim 2, wherein said print head body comprises a first rectangular slab having grooves formed in one face thereof to define said reservoir and said inlet and outlet channels, and a second rectangular slab having a plane face, said rectangular slabs being fixed together face-to-face.

4. The ink jet print head claimed in claim 3, wherein said slabs and said inlet and outlet tubes are stainless steel.

5. The ink jet print head claimed in claim 3, further including mounting studs on the side of said print head body opposite to said inlet and outlet tubes.

* * * * *